(12) United States Patent
Hinklin et al.

(10) Patent No.: US 9,067,172 B1
(45) Date of Patent: Jun. 30, 2015

(54) SOLID-STATE MEMBRANE MODULE

(71) Applicant: AIR PRODUCTS AND CHEMICALS, INC., Allentown, PA (US)

(72) Inventors: Thomas Ray Hinklin, Sandy, UT (US); Charles Arthur Lewinsohn, Salt Lake City, UT (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 0 days.

(21) Appl. No.: 14/166,438

(22) Filed: Jan. 28, 2014

(51) Int. Cl.
*B01D 53/22* (2006.01)
*B01D 71/02* (2006.01)
*C01B 3/50* (2006.01)
*B01D 69/12* (2006.01)

(52) U.S. Cl.
CPC ............ *B01D 53/228* (2013.01); *B01D 71/022* (2013.01); *C01B 3/505* (2013.01); *C01B 2203/0405* (2013.01); *B01D 69/12* (2013.01)

(58) Field of Classification Search
CPC .... B01D 53/228; B01D 71/022; B01D 69/12; C01B 3/505; C01B 2203/0405
See application file for complete search history.

(56) References Cited

U.S. PATENT DOCUMENTS

| | | | |
|---|---|---|---|
| 5,154,827 A * | 10/1992 | Ashelin et al. | 210/490 |
| 5,225,131 A * | 7/1993 | Tamaru et al. | 264/113 |
| 5,569,633 A | 10/1996 | Carolan et al. | |
| 5,681,373 A | 10/1997 | Taylor et al. | |
| 5,861,033 A * | 1/1999 | Martakos et al. | 623/1.1 |
| 5,911,860 A | 6/1999 | Chen et al. | |
| 6,056,807 A * | 5/2000 | Carolan et al. | 96/4 |
| 6,139,757 A * | 10/2000 | Ohmura et al. | 210/797 |
| 6,312,950 B1 * | 11/2001 | Ohmura et al. | 435/325 |
| 7,122,072 B2 | 10/2006 | Carolan et al. | |
| 7,300,561 B2 * | 11/2007 | Chaput et al. | 204/295 |
| 7,595,019 B2 | 9/2009 | Cutler et al. | |
| 8,222,166 B2 * | 7/2012 | Chu et al. | 442/153 |
| 8,628,843 B2 * | 1/2014 | MacLennan | 428/317.9 |
| 8,758,887 B2 * | 6/2014 | Yen et al. | 428/212 |
| 2004/0021240 A1 | 2/2004 | Chen et al. | |
| 2006/0207427 A1 | 9/2006 | Gordon et al. | |
| 2008/0168901 A1 | 7/2008 | Carolan et al. | |
| 2010/0255289 A1 * | 10/2010 | Lewinsohn et al. | 428/325 |
| 2011/0031100 A1 * | 2/2011 | Qtaishat et al. | 202/205 |
| 2011/0052900 A1 * | 3/2011 | Uno et al. | 428/304.4 |

(Continued)

FOREIGN PATENT DOCUMENTS

| | | |
|---|---|---|
| EP | 0732306 A1 | 9/1996 |
| WO | 2005009730 A1 | 2/2005 |
| WO | 2011095920 A1 | 8/2011 |

OTHER PUBLICATIONS

European Search Report EP 14152830, 2 pages, May 23, 2014.*

(Continued)

*Primary Examiner* — Jason M Greene
*Assistant Examiner* — Anthony Shumate
(74) *Attorney, Agent, or Firm* — Bryan C. Hoke, Jr.

(57) ABSTRACT

A module for separating oxygen from an oxygen-containing gaseous mixture comprising planar solid-state membrane units, each membrane unit comprising planar dense mixed conducting oxides layers, planar channel-free porous support layers, and one or more planar intermediate support layers comprising at least one channeled porous support layer. The porosity of the planar channeled porous support layers is less than the porosity of the planar channel-free porous support layers.

17 Claims, 4 Drawing Sheets

(56) References Cited

U.S. PATENT DOCUMENTS

| | | | |
|---|---|---|---|
| 2012/0285881 A1* | 11/2012 | Jikihara et al. | 210/490 |
| 2013/0083528 A1* | 4/2013 | Huang et al. | 362/249.01 |
| 2014/0339722 A1* | 11/2014 | Yen et al. | 264/45.9 |

OTHER PUBLICATIONS

Adler, "Chemical Expansivity of Electrochemical Ceramics," J. Am. Ceram. Soc. 84 (9) 2117-19 (2001).

Chou, Y. S., Stevenson, J. W., Armstrong, T. R. and Pederson, L. R. (2000), Mechanical Properties of La1-xSrxCO0.2Fe0.8O3 Mixed-Conducting Perovskites Made by the Combustion Synthesis Technique, Journal of the American Ceramic Society, 83; 1457-1464.

Lein et al., Mechanical properties of mixed conducting La.sub.(0.5)Sr.sub.(0.5)Fe.sub.(1-x)Co.sub.(3-D) (0<x<1) materials, J Solid State Electrochem (2006) 10; 635-642.

* cited by examiner

SOLID-STATE MEMBRANE MODULE

STATEMENT REGARDING FEDERALLY SPONSORED RESEARCH OR DEVELOPMENT

This invention was made with government support under Cooperative Agreement Number DE-FC26-98FT40343 between Air Products and Chemicals Inc. and the U.S. Department of energy. The U.S. Government has certain rights to this invention.

BACKGROUND

This invention relates to planar solid-state membrane modules formed from a plurality of membrane units which are capable of separating oxygen from an oxygen-containing gaseous mixture. The modules are fabricated from a plurality of planar solid-state membrane units comprising mixed conducting metallic oxides which exhibit electron conductivity and oxygen ion conductivity at elevated temperatures.

Ceramic materials containing certain mixed metal oxide compositions possess both oxygen ion conductivity and electronic conductivity at elevated temperatures. These materials, known in the art as mixed conducting metal oxides, may be used in applications including gas separation membranes and membrane oxidation reactors. These ceramic membranes are made of selected mixed metal oxide compositions and have been described as ion transport membranes (ITM). A characteristic property of these materials is that their oxygen stoichiometry is a thermodynamic function of temperature and oxygen partial pressure wherein the equilibrium oxygen stoichiometry decreases with increasing temperature and with decreasing oxygen partial pressure.

It is known that the dimensions of most materials change with changing temperature due to thermal expansion and contraction. In addition to these thermal dimensional changes, mixed conducting metal oxide materials undergo chemical dimensional changes that are a function of the metal oxide oxygen stoichiometry. At isothermal conditions, an article made of mixed conducting metal oxide material will increase in dimensions with decreasing oxygen stoichiometry. At isothermal conditions, the oxygen stoichiometry decreases with decreasing oxygen partial pressure. Since the equilibrium oxygen stoichiometry increases with decreasing temperature, an article made of mixed conducting metal oxides will contract due to both thermal and chemical dimensional changes as the temperature decreases. Conversely, an article made of mixed conducting metal oxides will expand by both thermal and chemical dimensional changes as the temperature increases at a constant oxygen partial pressure. This is described in an article entitled "Chemical Expansivity of Electrochemical Ceramics" by S. B. Adler in *J. Am. Ceram. Soc.* 84 (9) 2117-19 (2001).

Dimensional changes therefore result from equilibrium oxygen stoichiometry changes in mixed conducting metal oxide materials. Changing the temperature at a constant oxygen partial pressure or changing the oxygen partial pressure at a constant temperature will change the equilibrium oxygen stoichiometry of the mixed conducting metal oxide material. When a mixed conducting metal oxide is used as an ion transport membrane, for example, an oxygen partial pressure difference across the membrane creates a difference in the equilibrium oxygen stoichiometry at each of the two surfaces of the membrane, which in turn creates the thermodynamic driving force for oxygen ions to be transported through the membrane.

During startup of a gas separation system using mixed conducting metal oxide membranes, the temperature is increased and the oxygen partial pressure on one or both sides of the membrane may change. The equilibrium oxygen stoichiometry of the membrane material will change in response to the changes in temperature and oxygen partial pressure. Oxygen anions will be transported into or out of the membrane material and the membrane material will approach its equilibrium oxygen stoichiometry value. As the oxygen stoichiometry and temperature changes, the dimension of the membrane will change. The time required for the membrane to reach chemical equilibrium with the oxygen partial pressures on the surfaces of the membrane will depend on the oxygen anion transport rate into or out of the membrane. The time required for equilibration to occur is a function of the material composition, the temperature, and the dimension of the membrane modules.

Different membrane compositions will have different oxygen anion diffusivities, and compositions with higher diffusivities will equilibrate with the gas phase faster, all other factors being equal. For a given membrane composition, the oxygen anion diffusivity increases exponentially with temperature. Therefore, equilibration times decrease with increasing temperature. Finally, the equilibration time increases approximately with the square of the characteristic dimension (e.g., length or thickness) of the parts in the membrane modules. Therefore, thinner parts will equilibrate faster than thicker parts, all other factors being equal. As the thickness of a part increases and as the temperature decreases, it becomes increasingly difficult to keep the interior of the part in equilibrium with the gas phase due to sluggish diffusion of oxygen anions into or out of the part. In addition to behaving like thin parts, a possible additional benefit of a porous material is that porous layers next to a dense layer increases the surface area available for the surface reaction. Under conditions where the surface reaction of oxygen entering or leaving the ceramic is rate limiting, the increased surface area due to the porous layer will help keep the dense layer equilibrated.

It is known that temperature gradients in a mixed conducting metal oxide ceramic part can create differential strains due to differential thermal expansion and contraction. Similarly, oxygen stoichiometry gradients in a ceramic part can create differential strains due to differential chemical expansion and contraction. This gradient in oxygen stoichiometry may be sufficiently large to create a correspondingly large differential chemical expansion, and therefore large mechanical stresses, that lead to failure of the part. Therefore, it is desirable to avoid differential chemical expansion or at least to control the differential chemical expansion to below maximum allowable values.

There is a need for membrane unit designs capable of withstanding process transients and process upsets. During normal operation, an ITM Oxygen membrane unit is exposed to high oxygen partial pressure on the feed side and low oxygen partial pressure on the permeate side. This produces a differential chemical expansion between the feed and permeate sides of the membrane. Creep can be used to relax the stress caused by the differential expansion. During a process upset, the oxygen partial pressures on the feed and permeate sides can equilibrate. This causes a condition called stress reversal which is caused by the creep-relaxed differential strain being reduced to zero. This will result in tensile stresses on the feed side of the membrane or module. Therefore, there is a further need in the industry for a membrane design that is capable of withstanding the stress reversal condition caused by process upsets.

BRIEF SUMMARY

The present invention relates to a module for separating oxygen from an oxygen-containing gaseous mixture, the module comprising a plurality of planar solid-state membrane units.

There are several aspects of the module as outlined below.

Aspect 1. A module comprising a plurality of planar solid-state membrane units, each planar solid-state membrane unit comprising:
- a first planar dense mixed conducting oxide layer having no connected-through porosity, the first planar dense mixed conducting oxide layer having a first face and a second face, the second face opposite the first face;
- a first planar channel-free porous support layer having connected-through porosity, the first planar channel-free porous support layer having a first face and a second face, the second face opposite the first face, the first face of the first planar channel-free porous support layer contiguous with the second face of the first planar dense mixed conducting oxide layer;
- a first planar channeled porous support layer having connected-through porosity, the first planar channeled porous support layer having a first face and a second face, the second face opposite the first face, the first face of the first planar channeled porous support layer contiguous with the second face of the first planar channel-free porous support layer;
- a second planar dense mixed conducting oxide layer having no connected-through porosity, the second planar dense mixed conducting oxide layer having a first face and a second face, the second face opposite the first face and facing towards the second face of the first planar dense mixed conducting oxide layer;
- a second planar channel-free porous support layer having connected-through porosity, the second planar channel-free porous support layer having a first face and a second face, the second face opposite the first face, the first face of the second planar channel-free porous support layer contiguous with the second face of the second planar dense mixed conducting oxide layer; and
- an outer rim circumscribing the first planar dense mixed conducting oxide layer, the second planar dense mixed conducting oxide layer, the first planar channel-free porous support layer, the second planar channel-free porous support layer, and the first planar channeled porous support layer, the outer rim comprising a dense mixed conducting oxide layer having no connected-through porosity, wherein the dense mixed conducting oxide layer of the outer rim connects the first planar dense mixed conducting oxide layer to the second planar dense mixed conducting oxide layer;
- wherein the porosity of the first planar channeled porous support layer is less than the porosity of the first planar channel-free porous support layer.

Aspect 2. The module of aspect 1 wherein the porosity of the first planar channeled porous support layer is between 1% and 45% or is between 2% and 20%, and the porosity of the first planar channel-free porous support layer is between 10% and 50%, or is above 15% and at most 50%, or is between 20% and 50%.

Aspect 3. The module of aspect 1 or aspect 2 further comprising:
- a second planar channeled porous support layer having connected-through porosity, the second planar channeled porous support layer having a first face and a second face, the second face opposite the first face, the first face of the second planar channeled porous support layer contiguous with the second face of the second planar channel-free porous support layer;
- wherein the porosity of the second planar channeled porous support layer is less than the porosity of the second planar channel-free porous support layer.

Aspect 4. The module of aspect 3 wherein the porosity of the second planar channeled porous support layer is between 1% and 45% or is between 2% and 20% and the porosity of the second planar channel-free porous support layer is between 10% and 50%, or is above 15% and at most 50%, or is between 20% and 50%.

Aspect 5. The module of aspect 3 or aspect 4 further comprising:
- one or more planar intermediate support layers, the one or more intermediate support layers interlaying the second face of the first planar channeled porous support layer and the second face of the second planar channeled porous support layer.

Aspect 6. The module of any one of aspects 1 to 5 wherein the outer rim further comprises a channel-free porous support layer having connected-through porosity contiguous with the dense mixed conducting oxide layer of the outer rim wherein the channel-free porous support layer of the outer rim separates the dense mixed conducting oxide layer of the outer rim from the first planar channeled support layer, the second planar channeled support layer, if present, and the one or more planar intermediate support layers, if present.

Aspect 7. The module of any one of the preceding aspects wherein each of the first planar dense mixed conducting oxide layer, the second planar dense mixed conducting oxide layer, the first planar channel-free porous support layer, the second planar channel-free porous support layer, the first planar channeled porous support layer, the second planar channeled porous support layer, if present, the one or more planar intermediate support layers, if present, the dense mixed conducting oxide layer of the outer rim, and the channel-free porous support layer, if present, comprise a mixed conducting metal oxide material, each of the mixed conducting metal oxide materials having the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral.

Aspect 8. The module of any one of the preceding aspects wherein the first planar dense mixed conducting oxide layer in each and every membrane unit has a thickness ranging from 0.1 micrometers to 1000 micrometers or ranging from 1 micrometer to 200 micrometers, the second planar dense mixed conducting oxide layer in each and every membrane unit has a thickness ranging from 0.1 micrometers to 1000 micrometers or ranging from 1 micrometer to 200 micrometers, and the dense mixed conducting oxide layer of the outer rim in each and every membrane unit has a thickness ranging from 0.1 micrometers to 5000 micrometers or ranging from 10 micrometers to 500 micrometers.

Aspect 9. The module of any one of the preceding aspects further comprising a conduit operatively connected to the plurality of planar solid-state membrane units for conveying oxygen that has been separated from the oxygen-containing gaseous mixture by transport through at least one of the first planar dense mixed conducting oxide layer and the second planar dense mixed conducting oxide layer of each membrane unit and passage into the conduit via at least one of the first planar channel-free porous support layer and the second planar channel-free porous support layer of each membrane unit, wherein the conduit comprises a dense layer.

Aspect 10. The module of aspect 9 wherein the first planar dense mixed conducting oxide layer in each and every membrane unit has a thickness ranging from 0.1 micrometers to 1000 micrometers or ranging from 1 micrometer to 200 micrometers, the second planar dense mixed conducting oxide layer in each and every membrane unit has a thickness ranging from 0.1 micrometers to 1000 micrometers or ranging from 1 micrometer to 200 micrometers, the dense mixed conducting oxide layer of the outer rim in each and every membrane unit has a thickness ranging from 0.1 micrometers to 5000 micrometers or ranging from 10 micrometers to 500 micrometers, and the dense layer in each and every conduit in each and every membrane unit has a thickness ranging from 0.1 micrometers to 5000 micrometers or ranging from 10 micrometers to 500 micrometers.

Aspect 11. The module of any one of aspects 1 to 10 wherein $$1 \le \frac{Q_1 d_1^2 z_1}{Q_2 d_2^2 z_2} \le X_1 \text{ and } 1 \le \frac{d_1^3/Q_1}{d_2^3/Q_2} \le Y_1,$$

wherein $X_1$ is 10 or 50 or 100 and $Y_1$ is 10 or 50 or 100, where $Q_1$ is the stiffness of the first planar channeled porous support layer having connected-through porosity, $Q_2$ is the stiffness of the first planar dense mixed conducting oxide layer having no connected-through porosity, $d_1$ is the thickness of the first planar channeled porous support layer having connected-through porosity, $d_2$ is the thickness of the first planar dense mixed conducting oxide layer having no connected-through porosity, $z_1$ is the distance from the first planar channeled porous support layer having connected-through porosity to the mid-plane of the planar solid-state membrane unit comprising the first planar channeled porous support layer, $z_2$ is the distance from the first planar dense mixed conducting oxide layer having no connected-through porosity to the mid-plane of the planar solid-state membrane unit comprising the first planar dense mixed conducting oxide layer, where the mid-plane is the plane equidistant from the outer planar surfaces of the planar solid-state membrane unit.

Aspect 12. The module of any one of aspects 3 to 11 wherein $$1 \le \frac{Q_3 d_3^2 z_3}{Q_4 d_4^2 z_4} \le X_2 \text{ and } 1 \le \frac{d_3^3/Q_3}{d_4^3/Q_4} \le Y_2,$$

wherein $X_2$ is 10 or 50 or 100 and $Y_2$ is 10 or 50 or 100, where $Q_3$ is the stiffness of the second planar channeled porous support layer having connected-through porosity, $Q_4$ is the stiffness of the second planar dense mixed conducting oxide layer having no connected-through porosity, $d_3$ is the thickness of the second planar channeled porous support layer having connected-through porosity, $d_4$ is the thickness of the second planar dense mixed conducting oxide layer having no connected-through porosity, $z_3$ is the distance from the second planar channeled porous support layer having connected-through porosity to the mid-plane of the planar solid-state membrane unit comprising the second planar channeled porous support layer, $z_4$ is the distance from the second planar dense mixed conducting oxide layer having no connected-through porosity to the mid-plane of the planar solid-state membrane unit comprising the second planar dense mixed conducting oxide layer, where the mid-plane is the plane equidistant from the outer planar surfaces of the planar solid-state membrane unit.

Aspect 13. The module of any one of aspects 1 to 12 wherein the first planar channeled porous support layer has a volume-average pore radius, $\bar{a}$, ranging from 0.1 to 100 microns or ranging from 1 to 50 microns, where $$\bar{a} = \frac{\int_0^{V_g} a\, dV}{V_g},$$

where V is the volume per unit mass of pores having radius a, $V_g$ is the total pore volume per unit mass, and where a, V, and $V_g$ are measured by mercury porosimetry.

Aspect 14. The module of any one of aspects 3 to 12 wherein the second planar channeled porous support layer has a volume-average pore radius, $\bar{a}$, ranging from 0.1 to 100 microns or ranging from 1 to 50 microns, where $$\bar{a} = \frac{\int_0^{V_g} a\, dV}{V_g},$$

where V is the volume per unit mass of pores having radius a, $V_g$ is the total pore volume per unit mass, and where a, V, and $V_g$ are measured by mercury porosimetry.

Aspect 15. The module of any one of the preceding aspects wherein one or more of the layers, for example each of the layers, consist of a mixed conducting metal oxide material having the composition specified in aspect 7.

Aspect 16. The module of any one of the preceding aspects wherein the porosity of the first planar channel-free porous support layer is at least the porosity of the first planar channeled porous support layer plus at least 5%.

Aspect 17. The module of any one of the preceding aspects and aspect 3 wherein the porosity of the second planar channel-free porous support layer is at least the porosity of the second planar channeled porous support layer plus at least 5%.

Aspect 18. The module of any one of the preceding aspects further comprising a first porous outer layer having connected-through porosity, the first porous outer layer having a first face and a second face, the second face opposite the first face, the first face of the first porous outer layer contiguous with the first face of the first planar dense mixed conducting oxide layer, Aspect 19. The module of any one of the preceding aspects further comprising a second porous outer layer having connected-through porosity, the second porous outer layer having a first face and a second face, the second face opposite the first face, the first face of the second porous outer layer contiguous with the first face of the second planar dense mixed conducting oxide layer.

DETAILED DESCRIPTION

Figure 1:
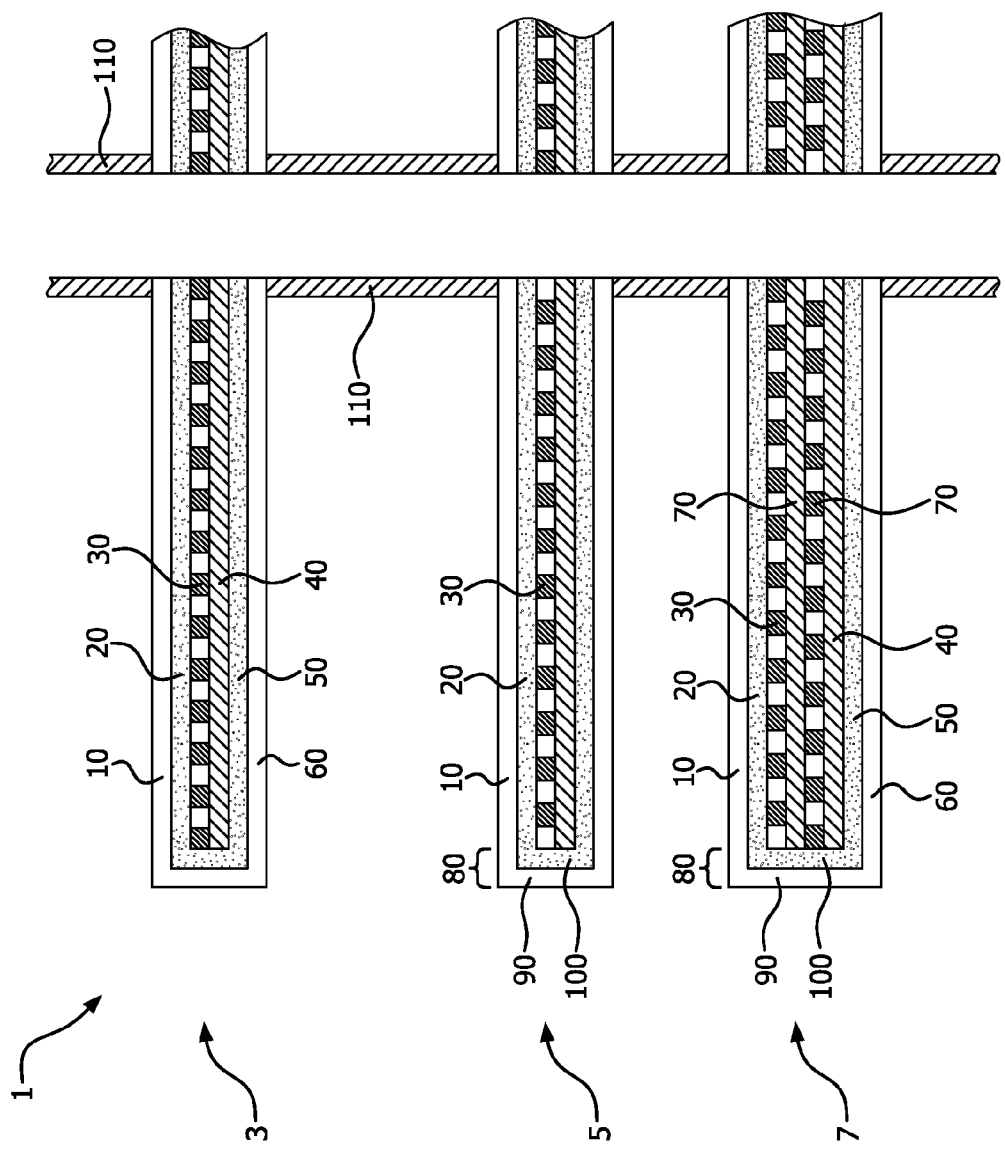
FIG. 1 is a cutaway view of a membrane module which illustrates planar solid-state membrane units.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of the first entity, (2) the second entity, and (3) the first entity and the second entity. The term "and/or" placed between the last two entities of a list of 3 or more entities means at least one of the entities in the list including any specific combination of entities in this list.

As used herein, "first," "second," "third," etc. are used to distinguish from among a plurality of steps and/or features, and is not indicative of the total number, or relative position in time and/or space unless expressly stated as such.

As used herein, "plurality" means at least two.

The term "dense" when used to describe a layer means that the layer does not possess a network of pores. However minor fissures or holes may be present to a limited extent provided that separation selectivity is not reduced to unacceptable levels. A dense layer has no connected-through porosity.

The term "connected-through porosity" means that the layer has a matrix of pores throughout its three-dimensional structure which is capable of transferring process gases from one side of the layer to the opposite side of the layer.

Having no connected-through porosity means that the layer lacks connected-through porosity.

"Channeled" means to have formed channels in the layer. Formed channels are passages that have been deliberately shaped and are of a prearranged and ordered structure, in contrast with a porous structure, which is random. Channels can be formed in the green tape by means known in the art, including laser cutting and punching.

The "porosity" of a channeled porous layer is the porosity of the material in which the channels of that layer are formed.

The porosity can in particular be measured by the Archimedes method, ASTM Standard C20.

"Channel-free" means the absence of formed channels which are capable of transferring process gases from one side of the layer to the opposite side of the layer.

The term "contiguous" means touching or connected throughout.

Illustrative embodiments of the invention are described below. While the invention is susceptible to various modifications and alternative forms, specific embodiments thereof have been shown by way of example in the drawings and are herein described in detail. It should be understood, however that the description herein of specific embodiments is not intended to limit the invention to the particular forms disclosed, but on the contrary, the invention is to cover all modifications, equivalents, and alternatives falling within the scope of the invention as defined by the appended claims.

For the purposes of simplicity and clarity, detailed descriptions of well-known devices, circuits, and methods are omitted so as not to obscure the description of the present invention with unnecessary detail.

Referring now to FIG. 1 showing a cutaway view of a membrane module 1 for separating oxygen from an oxygen-containing gaseous mixture, which illustrates planar solid-state membrane units 3, 5, 7.

Module 1 comprises a plurality of planar solid-state membrane units.

Each planar solid state membrane unit comprises a first planar dense mixed conducting oxide layer 10 having no connected-through porosity. The first planar dense mixed conducting oxide layer 10 has a first face and a second face, the second face opposite the first face. The first face typically forms a portion of the outer surface of a planar solid-state membrane unit and is the feed side for contacting with the oxygen-containing gaseous mixture.

The first planar dense mixed conducting oxide layer is planar, meaning that it has surfaces that lie in a plane (e.g. the first face and the second face). The first face and the second face of the first planar dense mixed conducting oxide layer are generally parallel. The first planar dense mixed conducting oxide layer is dense, and comprises a mixed conducting metal oxide material.

The thickness of the first planar dense mixed conducting oxide layer may range from 0.1 micrometers to 1000 micrometers or from 1 micrometer to 200 micrometers. The first planar dense mixed conducting oxide layer of each and every membrane unit of the module may have a thickness ranging from 0.1 micrometers to 1000 micrometers or ranging from 1 micrometer to 200 micrometers.

Each planar solid state membrane unit also comprises a first planar channel-free porous support layer 20 having connected-through porosity. The first planar channel-free porous support has a first face and a second face, the second face opposite the first face. The first face of the first planar channel-free porous support layer is contiguous with the second face of the first planar dense mixed conducting oxide layer.

The first planar channel-free porous support layer is planar, meaning that it has surfaces that lie in a plane (e.g. the first face and the second face). The first face and the second face of the first planar channel-free porous support layer are generally parallel. The first planar channel-free porous support layer is channel-free and porous.

The thickness of the first planar channel-free porous support layer may range from 1 micrometer to 10,000 micrometers or may range from 10 to 1000 micrometers. The porosity of the first planar channel-free porous support layer may range from 10 to 50% or may range from 20% to 50%. The porosity is the porosity as measured by the Archimedes Method, ASTM Standard C20. The first planar channel-free porous support layer may have a volume-average pore radius, $\bar{a}$, ranging from 0.1 to 100 microns or ranging from 1 to 50 microns, where $$\bar{a} = \frac{\int_0^{V_g} a \, dV}{V_g},$$

where V is the volume per unit mass of pores having radius a, $V_g$ is the total pore volume per unit mass, and where a, V, and $V_g$ are measured by mercury porosimetry. This method is explained in J. M. Smith, *Chemical Engineering Kinetics*, McGraw-Hill, New York, 1981, p. 338-347.

Each planar solid state membrane unit also comprises a second planar dense mixed conducting oxide layer 60 having no connected-through porosity. The second planar dense mixed conducting oxide layer has a first face and a second face, the second face opposite the first face. The first face typically forms a portion of the outer surface of a planar solid-state membrane unit and is the feed side for contacting with the oxygen-containing gaseous mixture.

The second planar dense mixed conducting oxide layer is planar, meaning that it has surfaces that lie in a plane (e.g. the first face and the second face). The first face and the second face of the second planar dense mixed conducting oxide layer are generally parallel. The second planar dense mixed conducting oxide layer is dense, and comprises a mixed conducting metal oxide material.

The thickness of the second planar dense mixed conducting oxide layer may range from 0.1 micrometers to 1000 micrometers or from 1 micrometer to 200 micrometers. The second planar dense mixed conducting oxide layer of each and every membrane unit of the module may have a thickness ranging from 0.1 micrometers to 1000 micrometers or ranging from 1 micrometer to 200 micrometers.

Each planar solid state membrane unit also comprises a second planar channel-free porous support layer 50 having connected-through porosity. The second planar channel-free porous support has a first face and a second face, the second face opposite the first face. The first face of the second planar channel-free porous support layer is contiguous with the second face of the second planar dense mixed conducting oxide layer.

The second planar channel-free porous support layer is planar, meaning that it has surfaces that lie in a plane (e.g. the first face and the second face). The first face and the second face of the second planar channel-free porous support layer are generally parallel. The second planar channel-free porous support layer is channel-free and porous.

The thickness of the second planar channel-free porous support layer may range from 1 micrometer to 10,000 micrometers or may range from 10 to 1000 micrometers. The porosity of the second planar channel-free porous support layer may range from 10 to 50% or may range from 20% to 50%. The porosity is the porosity as measured by Archimedes method, ASTM Standard C20. The second planar channel-free porous support layer may have a volume-average pore radius, $\bar{a}$, ranging from 0.1 to 100 microns or ranging from 1 to 50 microns, where $$\bar{a} = \frac{\int_0^{V_g} a\, dV}{V_g},$$

where V is the volume per unit mass of pores having radius a, $V_g$ is the total pore volume per unit mass, and where a, V, and $V_g$ are measured by mercury porosimetry.

Each planar solid state membrane unit also comprises one or more intermediate support layers 30, 40, and 70. The one or more intermediate support layers comprise at least one channeled layer. The one or more intermediate support layers interlay the second face of the first planar channel-free porous support layer 20 and the second face of the second planar channel-free porous support layer 50.

The one or more intermediate support layers may comprise a first planar channeled porous support layer 30 having connected-through porosity. The first planar channeled porous support layer has a first face and a second face, the second face opposite the first face. As shown in the figure, the first face of the first planar channeled porous support layer is contiguous with the second face of the first planar channel-free porous support layer.

The first planar channeled porous support layer is planar, meaning that it has surfaces that lie in a plane (e.g. the first face and the second face). The first planar channeled porous support layer is channeled and porous.

The thickness of the first planar channeled porous support layer may range from 1 micrometer to 10,000 micrometers or may range from 10 to 2000 micrometers. The porosity of the first planar channeled porous support layer may range from 1 to 45% or may range from 2% to 20%. The porosity is the porosity as measured by Archimedes Method, ASTM Standard C20. The first planar channeled porous support layer may have a volume-average pore radius, $\bar{a}$, ranging from 0.1 to 100 micrometers or ranging from 1 to 50 micrometers, where $$\bar{a} = \frac{\int_0^{V_g} a\, dV}{V_g},$$

where V is the volume per unit mass of pores having radius a, $V_g$ is the total pore volume per unit mass, and where a, V, and $V_g$ are measured by mercury porosimetry.

The one or more intermediate support layers may comprise a second planar channeled porous support layer 40 having connected-through porosity. The second planar channeled porous support layer 40 has a first face and a second face, the second face opposite the first face. As shown in the figure, the first face of the second planar channeled porous support layer 40 is contiguous with the second face of the second planar channel-free porous support layer 50.

The second planar channeled porous support layer is planar, meaning that it has surfaces that lie in a plane (e.g. the first face and the second face). The second planar channeled porous support layer is channeled and porous.

The thickness of the second planar channeled porous support layer 40 may range from 1 micrometer to 10,000 or may range from 10 to 2000 micrometers. The porosity of the second planar channeled porous support layer may range from 1 to 45% or may range from 2% to 20%. The porosity is the porosity as measured by Archimedes Method, ASTM Standard C20. The second planar channeled porous support layer may have a volume-average pore radius, $\bar{a}$, ranging from 0.1 to 100 microns or ranging from 1 to 50 microns, where $$\bar{a} = \frac{\int_0^{V_g} a\, dV}{V_g},$$

where V is the volume per unit mass of pores having radius a, $V_g$ is the total pore volume per unit mass, and where a, V, and $V_g$ are measured by mercury porosimetry.

The one or more planar intermediate support layers may comprise other planar intermediate support layers 70 in addition to the first planar channeled support layer 30 and the second planar channeled support layer 40 as shown in planar solid-state membrane unit 7.

As shown in the figure for planar solid-state membrane unit 7, the other planar intermediate support layers 70 interlay the second face of the first planar channeled porous support layer 30 and the second face of the second planar channeled porous support layer 40.

The other planar intermediate support layers 70 may comprise channeled porous support layers and/or channel-free porous support layers. The thicknesses of each of the one or more planar intermediate support layers may range from 1 to 10,000 micrometers or may range from 10 to 2000 micrometers. The one or more planar intermediate support layers may be porous. If the one or more planar intermediate support layers are porous, the porosity of each of the one or more planar intermediate support layers may range from 1 to 45% or may range from 2% to 20%. The porosity is the porosity as measured by Archimedes Method, ASTM Standard C20. The first planar channeled porous support layer and the second planar channeled porous support layer may each have a volume-average pore radius, $\bar{a}$, ranging from 0.1 to 100 microns or ranging from 1 to 50 microns, where $$\bar{a} = \frac{\int_0^{V_g} a\, dV}{V_g},$$

where V is the volume per unit mass of pores having radius a, $V_g$ is the total pore volume per unit mass, and where a, V, and $V_g$ are measured by mercury porosimetry.

The porosity of the first planar channeled porous support layer 30 is less than the porosity of the first planar channel-free porous support layer 20. The porosity of the first planar channeled porous support layer may be between 1% and 45% or may be between 2% and 20%, and the porosity of the first planar channel-free porous support layer may be between 10% and 50% or may be between 20% and 50%.

When a second planar channeled porous support layer is present, the porosity of the second planar channeled porous support layer 40 may be less than the porosity of the second planar channel-free porous support layer 50. The porosity of the second planar channeled porous support layer may be between 1% and 45% or may be between 2% and 20%, and the porosity of the second planar channel-free porous support layer may be between 10% and 50% or may be between 20% and 50%.

The lower porosity of the first and second planar channeled porous support layers 30 and 40 allows the channeled layers to be stronger and more creep resistant since strength increases and creep rates decrease with decreasing porosity. The higher porosity of the first and second planar channel-free porous support layers 20 and 50 next to the first and second planar dense mixed conducting oxide layers allows a lower pressure drop through those layers.

Each planar solid state membrane unit may also optionally comprise a first porous outer layer (not shown) having connected-through porosity, the first porous outer layer having a first face and a second face, the second face opposite the first face, the first face of the first porous outer layer contiguous with the first face of the first planar dense mixed conducting oxide layer. Each planar solid state membrane unit may also optionally comprise a second porous outer layer (not shown) having connected-through porosity, the second porous outer layer having a first face and a second face, the second face opposite the first face, the first face of the second porous outer layer contiguous with the first face of the second planar dense mixed conducting oxide layer. The optional first and second porous outer layer may provide surface enhancement and/or protection of the dense mixed conducting oxide layers.

Each planar solid-state membrane unit 3, 5, and 7 has an outer rim 80 circumscribing the first planar dense mixed conducting oxide layer 10, the second planar dense mixed conducting oxide layer 60, the first planar channel-free porous support layer 20, the second planar channel-free porous support layer 50, and the one or more planar intermediate support layers 30, 40, 70. The outer rim 80 comprises a dense mixed conducting oxide layer 90 having no connected-through porosity. The dense mixed conducting oxide layer 90 connects the first planar dense mixed conducting oxide layer 10 to the second planar dense mixed conducting oxide layer 60, thereby forming a continuous dense mixed conducting oxide layer about the solid-state membrane unit. The dense mixed conducting oxide layer 90 is dense, and it is made of a mixed conducting metal oxide material.

The outer surface of the outer rim may be square with (perpendicular to) the first planar dense mixed conducting oxide layer 10 and the second planar dense mixed conducting oxide layer 60 as shown in FIG. 1. Alternatively, the outer rim may be rounded (not shown), where there are no sharp corners or edges. A rounded outer rim may be preferred to improve thickness uniformity of any coatings that may be applied.

The thickness of the dense mixed conducting oxide layer of the outer rim may range from 0.1 micrometers to 5000 micrometers or from 10 to 500 micrometers. The thickness of the dense mixed conducting oxide layer is measured in the direction normal to the outer surface of the outer rim.

The outer rim 80 may comprise a channel-free porous support layer 100 having connected-through porosity. The channel-free porous support layer 100 is contiguous with the dense mixed conducting oxide layer 90.

The channel-free porous support layer 100 of the outer rim 80 may separate the dense mixed conducting oxide layer 90 of the outer rim from the first planar channeled support layer 30, the second planar channeled support layer 40, and any other planar intermediate support layers 70 that may be present.

The dense mixed conducting oxide layer of the outer rim of each and every membrane unit of the module may have a thickness ranging from 0.1 micrometers to 5000 micrometers or ranging from 10 micrometers to 500 micrometers.

The channel-free porous support layer 100 has no channels and is porous.

The thickness of the channel-free porous support layer of the outer rim may range from 1 micrometer to 10,000 micrometers or from 10 to 500 micrometers. The thickness of the channel-free porous support layer is measured in the direction normal to the outer surface of the outer rim. The porosity of the channel-free porous support layer of the outer rim may have a lower limit of 1% or 5% or 10% or 20% and may have an upper limit of 45% or 50%. The porosity is the porosity as measured by Archimedes Method, ASTM Standard C20. The channel-free porous support layer of the outer rim may have a volume-average pore radius, $\bar{a}$, ranging from 0.1 to 100 microns or ranging from 1 to 50 microns, where $$\bar{a} = \frac{\int_0^{V_g} a\, dV}{V_g},$$

where V is the volume per unit mass of pores having radius a, $V_g$ is the total pore volume per unit mass, and where a, V, and $V_g$ are measured by mercury porosimetry.

The mixed conducting metal oxide material for each of the first planar dense mixed conducting oxide layer 10, the second planar dense mixed conducting oxide layer 60, the first planar channel-free porous support layer 20, the second planar channel-free porous support layer 50, the one or more planar intermediate support layers 30, 40, 70, the dense mixed conducting oxide layer 90 of the outer rim 80, and the channel-free porous support layer 100, if present, may comprise a material having the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \le x \le 1$, $0 \le y \le 1$, and $0.95 < w < 1.05$; and wherein $\delta$ is a number that renders the compound charge neutral. The layers may each consist of a material having this composition.

As shown in the figure, the module may further comprise one or more conduits 110. The one or more conduits 110 are operatively connected to the plurality of solid-state membrane units for conveying oxygen that has been separated from the oxygen-containing gaseous mixture by transport through one of the first planar dense mixed conducting oxide layer 10 and the second planar dense mixed conducting oxide layer 60 of each membrane unit 1. Oxygen that has been separated from the oxygen-containing gaseous mixture passes into the conduit 110 via one of the first planar channel-free porous support layer 20 and the second planar channel-free porous support layer 50 of each membrane unit 3, 5, 7.

The conduit 110 or each of a plurality of conduits 110 comprises a dense layer. The dense layer may comprise a mixed conducting metal oxide material. The mixed conducting metal oxide material may be the same general stoichiometric composition as the mixed conducting metal oxide materials of the planar solid-state membrane units.

Conduits used in the module may be as described in U.S. Pat. No. 7,955,423 B2.

The dense layer in each and every conduit in each and every membrane unit may have a thickness ranging from 0.1 micrometers to 5000 micrometers or ranging from 10 micrometers to 500 micrometers.

The one or more intermediate support layers 30, 40, 70 may be such that, for load bearing, the stress in the plane of that layer is higher than those layers that it supports. More specifically, the relationship between the stiffness and membrane unit geometry may be such that $$1 \le \frac{Q_1 d_1^2 z_1}{Q_2 d_2^2 z_2} \le X_1$$

and $$1 \le \frac{d_1^3/Q_1}{d_2^3/Q_2} \le Y_1,$$

wherein $X_1$ is 10 or 50 or 100 and $Y_1$ is 10 or 50 or 100, where $Q_1$ is the stiffness of the first planar channeled porous support layer having connected-through porosity, $Q_2$ is the stiffness of the first planar dense mixed conducting oxide layer having no connected-through porosity, $d_1$ is the thickness of the first planar channeled porous support layer having connected-through porosity, $d_2$ is the thickness of the first planar dense mixed conducting oxide layer having no connected-through porosity, $z_1$ is the distance from the first planar channeled porous support layer having connected-through porosity to the mid-plane of the planar solid-state membrane unit comprising the first planar channeled porous support layer, $z_2$ is the distance from the first planar dense mixed conducting oxide layer having no connected-through porosity to the mid-plane of the planar solid-state membrane unit comprising the first planar dense mixed conducting oxide layer. The mid-plane is the plane equidistant from the outer planar surfaces of the planar solid-state membrane unit.

The relationship between the stiffness and membrane unit geometry may also be such that $$1 \le \frac{Q_3 d_3^2 z_3}{Q_4 d_4^2 z_4} \le X_2$$

and $$1 \le \frac{d_3^3/Q_3}{d_4^3/Q_4} \le Y_2,$$

wherein $X_2$ is 10 or 50 or 100 and $Y_2$ is 10 or 50 or 100, where $Q_3$ is the stiffness of the second planar channeled porous support layer having connected-through porosity, $Q_4$ is the stiffness of the second planar dense mixed conducting oxide layer having no connected-through porosity, $d_3$ is the thickness of the second planar channeled porous support layer having connected-through porosity, $d_4$ is the thickness of the second planar dense mixed conducting oxide layer having no connected-through porosity, $z_3$ is the distance from the second planar channeled porous support layer having connected-through porosity to the mid-plane of the planar solid-state membrane unit comprising the second planar channeled porous support layer, $z_4$ is the distance from the second planar dense mixed conducting oxide layer having no connected-through porosity to the mid-plane of the planar solid-state membrane unit comprising the second planar dense mixed conducting oxide layer. The mid-plane is the plane equidistant from the outer planar surfaces of the planar solid-state membrane unit.

The stiffness, $Q_1$ is defined as the ratio of force/displacement for a layer.

The modules may be constructed using any known technique, for example, as described in U.S. Pat. Nos. 5,332,597, 5,681,373, 7,011,898, 7,094,301, 7,179,323, 7,279,027, 7,513,932, 7,695,580, and 7,955,423 incorporated herein by reference.

For example, the membrane units of the present invention may be prepared by applying a dense layer of a desired mixed conducting metal oxide onto the desired porous substrate by conventional chemical vapor deposition techniques followed by sintering to obtain the desired dense layer.

Alternatively, a coating may be applied onto the desired porous substrate using a suspension of the desired mixed conducting metal oxide. The porous substrate can be a so-called "green" body. Following a sintering step, the coating will become dense while the substrate remains porous. The mixed conducting metal oxide material is called "green" before it is sintered.

For the dense layer, a cast ceramic tape of the mixed conducting multicomponent metal oxide material with expansion properties similar to the materials used in the porous channel-free support layers or the porous channeled layers of the membrane module may be used such that the ceramic tape becomes dense after sintering, for example with less than 1% open porosity.

For the porous layers, a cast ceramic tape of the same mixed conducting metal oxide as the ceramic material used for the dense layer with coarse particle size and/or a pore former may be used such that the material is porous after sintering, for example in the range of 1% to 50% open porosity. The porosity can be adjusted by using different particle sizes and/or amounts of pore former. More pore former or a coarser particle size will increase the porosity.

Examples of pore formers include microcellulose, rice starch, graphite, polypropylene, polyethylene, starch, and other organic materials known in the art.

Channels may be cut in the green layers using punching, laser cutting or other means known in the art to produce the green featured layers.

Featured porous layers, non-featured porous layers and dense layers can be laminated together in the green state using solvent bonding and/or pressure. The laminated body is called a green wafer.

The layer that becomes the dense layer on the perimeter can be applied to the green wafer by dipcoating the perimeter of the green wafer into a suspension, spraying a suspension, roll coating a suspension, electrostatic spraying of powder onto the perimeter, winding cast ceramic tape around the edge or other coating techniques known in the art. Multiple coats with intermediate drying, if necessary, can be used to ensure an even, dense coat with no connected-through porosity on the outside of the wafer after sintering. Additional coats can be applied after a sintering step also, followed by a second sintering step.

If the outer rim or perimeter comprises of a dense layer supported by one, or more, unfeatured porous layers that contact the channeled layers, these can be applied to the wafer prior to applying the dense, outer layer by any of the application methods described above.

If the outer rim comprises a porous outer layer in contact with the dense mixed conducting oxide layer of the outer rim of the planar solid state membrane unit, where the dense mixed conducting oxide layer of the outer rim supported by one, or more, unfeatured porous layers that contact the one or more planar intermediate support, this porous outer layer can be applied to the wafer subsequent to applying the dense mixed conducting oxide layer of the outer rim by any of the application methods described above.

Any combination of porous outer, dense, and porous support layers can be applied by a combination of applications to the wafer in the green, partially sintered, or fully sintered conditions.

The outermost side of the dense mixed conducting oxide layer of the outer rim may be in contact with an outer porous layer. The channel-free porous support layer, which is in contact with the inner side of the dense mixed conducting oxide layer of the outer rim may comprise multiple porous layers with increasing or decreasing porosity as desired by permeability and reliability requirements.

The present module for separating oxygen from oxygen-containing gas mixtures is used in the same way as prior art modules having planar solid state membrane units for separating oxygen. Operation of prior art modules is known and is described, for example, in U.S. Pat. Nos. 5,332,597, 5,681, 373, 7,122,072, incorporated herein by reference.

Example

The benefit of a porous support layer for the outer rim that spans the membrane layer of one side of an oxygen producing, planar component to the membrane layer of the other side, can be demonstrated by considering the thickness, t, of a dense, gas-tight outer layer that is required to withstand the externally applied pressure, P, during operation.

According to the Standard Handbook of Engineering Calculations, 3$^{rd}$ Edition, T. G. Hicks, S. D. Hicks, J. Leto [eds], McGraw-Hill, NY, 1995, the relationship between the stress, $\sigma$, the externally applied pressure, P, the dimensions of the microchannel feature at the edge of the wafer, characteristic lengths a and b, and the thickness, t, is $$\sigma = \frac{Pa^2b^2}{2(a^2+b^2)t^2}.$$

Figure 2:
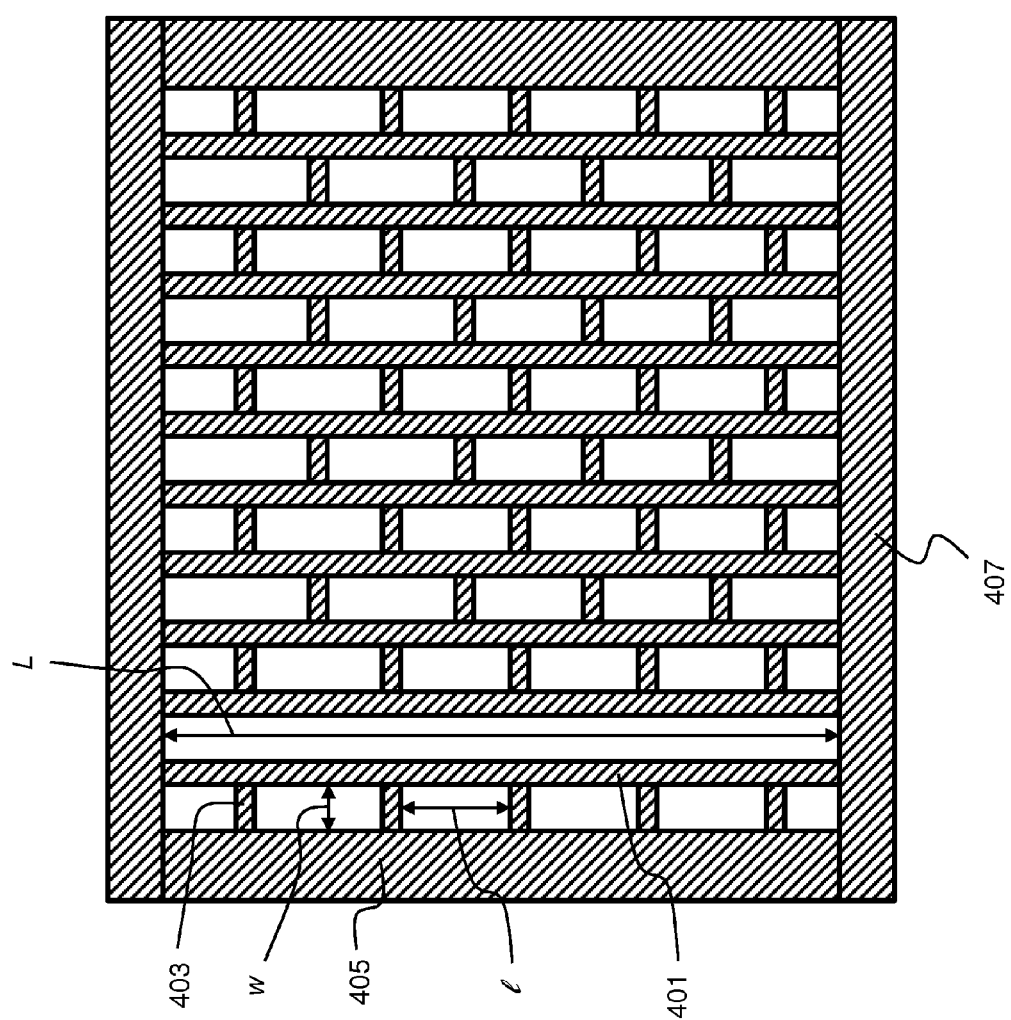
FIG. 2 is a schematic view of a planar channeled layer.

FIG. 2 shows a 2-dimensional schematic view of a channeled layer of a wafer. Channels in the planar channeled porous support layers have dimensions of height (h) measured normal to the plane of the layer, width (w), the minor axis of the channel measured parallel to the plane of the layer, and length (I), the major axis of the channel measured parallel to the plane of the layer. Each channel is separated from another channel by a wall 401 of porous ceramic material. The height of the channel is generally the thickness of the support layer. The width of the channel is the distance between adjacent walls 401, shown in the FIG. 2 as w. The length of the channel could span from one edge of the wafer to another edge of the wafer as shown as L. In the case of a single channel spanning from one edge of the wafer to the opposing edge of the wafer, the length of the channel can be substantially the width or length of the wafer (i.e. less the thickness of any edge features, such as the porous, outer rim and dense, outer rim. Alternatively, a plurality of channel segments can span from one edge of the wafer to an opposing edge of the wafer. The channel segments are separated by channel end walls 403. In the case of channel segments, the length of the channel is simply the length of the channel segment shown in FIG. 2 as l.

At the edge of a wafer, depending upon the orientation of the channel to the edge face, the edge can span across the height and the width of a planar channeled porous support layer as shown for edge face 407 or the edge can span across the length and the height of a planar channeled porous support layer as shown for edge face 405.

For the purpose of this example, a segmented channel is considered. The design thickness of the dense layer should be calculated based on the height, h, and length, l, of the segmented channel. Then in the calculation, we can take a=h and b=l.

For an externally applied pressure of 1.65 MPa, height, a=h=2000 µm, and length b=l=2000 µm, the thickness, t, required to maintain the stress, $\sigma$, less than approximately 30 MPa (see Table I), in an unsupported gas-tight outer layer, is 235 µm.

By comparison, if the dense, gas-tight outer layer is supported by a porous layer with an average pore radius, r=50 µm (assume a=b=2r=100 µm), then the required thickness of the dense layer to support the same stress is 12 µm.

This calculation shows that the invention has particular advantages when the porous layer thickness is greater than the pore diameter of the porous layer.

Additionally, the reduction in time required to reach equilibrium vacancy concentrations in this thinner dense layer significantly reduces stresses due to chemical expansion and enhances the reliability of these components.

The applicants have surprisingly discovered that the strength of the membrane material is a maximum at open porosity values greater than 2% but less than about 20%. The mechanical integrity of the membrane is maximized when the membrane is made from the strongest material. The following examples show how strength varies with open porosity.

Powder with the composition $La_{0.4}Sr_{0.6}CoO_{3-\delta}$, was made by mixing appropriate amounts of $La_2O_3$, $SrCO_3$ and $Co_3O_4$ powders, calcining the powder at 1200° C. and then milling the powder to a desired particle size using a jet mill. Powder was classified into 1 of 4 size ranges: 5-15 µm, 2-10 µm, 2-20 µm, or a powder with an average particle size of 2 µm. Bars were either made from the classified powder or a mixture of a classified powder and the powder with an average particle size of 2 µm. Powder was pressed into rectangular bars using the pressing pressure given in Table 1. Bars were sintered at 1250° C. for the times given in Table 1. The bars after sintering were approximately 50 mm×3 mm×6 mm in dimensions. The strength of the bars was measured by breaking them in 4 point bending, using a 40 mm outer span, 20 mm inner span and 0.5 mm/min crosshead speed. Table 1 lists the powder particle size, pressing pressure, sintering time, open porosity and average strength for each type of bend bar. 5 bars were made of each type. Density was measured using the Archimedes method, ASTM C20.

Figure 3:
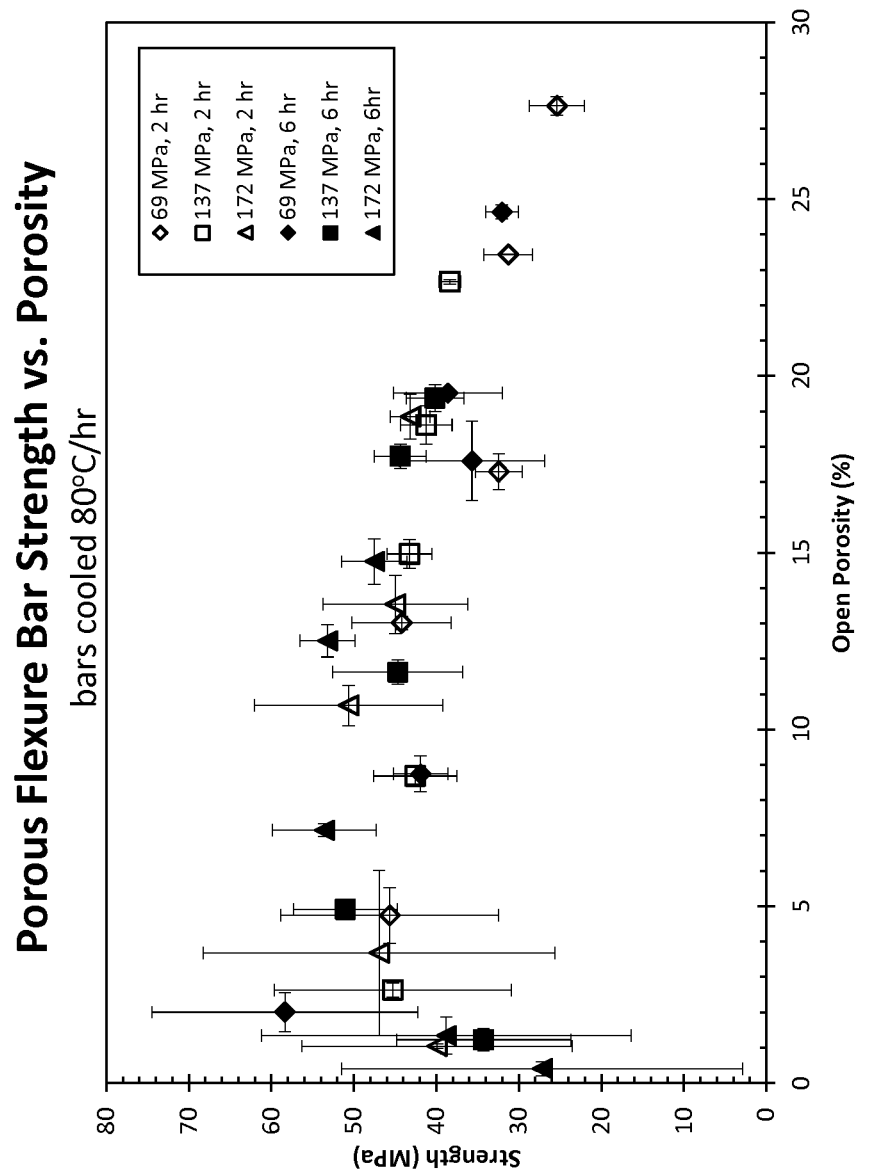
FIG. 3 is a plot of strength versus porosity for rectangular bars of porous material.

FIG. 3 shows the strength as a function of open porosity. The maximum strength occurs >1% open porosity. Typically, strength increases with increasing density (decreasing porosity). However, in the mixed conducting membrane materials, the maximum strength occurs at low porosity. This is due to the ability of the porous material to equilibrate with the gas phase. The pores allow oxygen to flow and diffuse in the gas phase throughout the part. In a dense part, the oxygen would have to diffuse in the solid state, which is a much slower process. Therefore, it is advantageous to make the channeled layer of the strongest material, which is the material with open porosity of >1% and preferably <20% open porosity.

Figure 4:
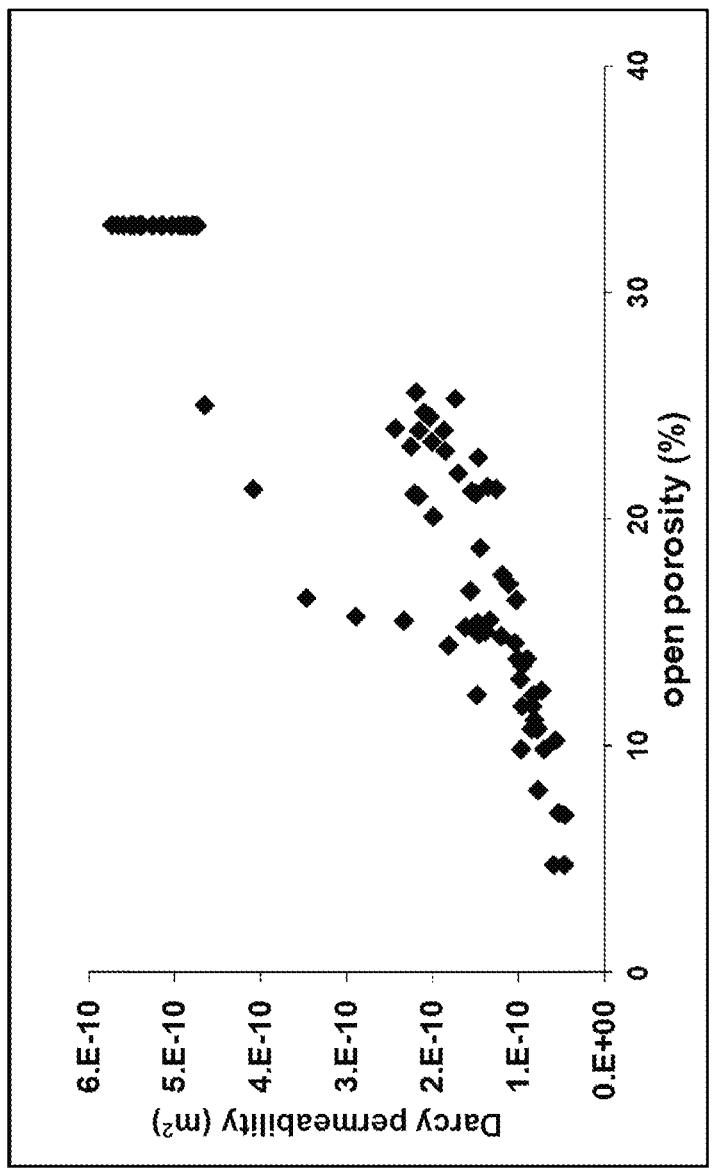
FIG. 4 is a plot permeability versus porosity for porous discs.

The porous layer that is adjacent to the dense layer must allow a high flux of gaseous oxygen to flow through it with a minimum pressure drop. As is well known in the art, the pressure drop through a porous material is inversely proportional to the open porosity. The permeability of the porous layer was measured by flowing helium gas through porous disks. Disks were made by pressing powder in the particle sizes listed in Table 1 into 2 cm diameter×200 micron thick disks, followed by sintering at 1250° C. The pressure drop was measured as a function of the flow rate of helium gas. The permeability was calculated using the Darcy equation:

Permeability=$\mu \times L \times V / \Delta P$ where $\mu$=viscosity of the helium, L is the thickness of the porous disk, V is the superficial linear velocity of the helium and $\Delta P$ is the pressure drop. The permeability as a function of open porosity is plotted in FIG. 4. Preferred permeabilities are >$10^{-10}$ m², preferably above $1.5 \times 10^{-10}$ m². This would require open porosities >15%, preferably >25%.

The mechanical strength of a membrane is enhanced by keeping the porosity of the planar channeled porous support layers >1% but <15% open porosity, while the pressure drop of the planar channel-free porous support layer adjacent to the dense layer is minimized when the porosity of the planar channel-free porous support layer is >15% open porosity. Therefore the membrane module is improved by keeping the porosity of the planar channeled porous support layer less than the porosity of the planar channel-free porous support layer.

TABLE 1

| Powder | Pressing pressure (MPa) | Sintering Time (hrs) | Open Porosity (%) | Average Strength (MPa) |
| --- | --- | --- | --- | --- |
| 5-15 µm | 69 | 2 | 27.6 | 25.4 |
| 5-15 µm + 10% 2 µm | 69 | 2 | 23.4 | 31.3 |
| 5-15 µm + 20% 2 µm | 69 | 2 | 17.3 | 32.5 |
| 2-10 µm | 69 | 2 | 4.7 | 45.7 |
| 2-20 µm | 69 | 2 | 13.0 | 44.2 |
| 5-15 µm | 137 | 2 | 22.7 | 38.4 |
| 5-15 µm + 10% 2 µm | 137 | 2 | 18.6 | 41.3 |
| 5-15 µm + 20% 2 µm | 137 | 2 | 15.0 | 43.3 |
| 2-10 µm | 137 | 2 | 2.6 | 45.3 |
| 2-20 µm | 137 | 2 | 8.7 | 42.6 |
| 5-15 µm | 172 | 2 | 18.8 | 43.2 |
| 5-15 µm + 10% 2 µm | 172 | 2 | 13.5 | 45.0 |
| 5-15 µm + 20% 2 µm | 172 | 2 | 10.7 | 50.7 |
| 2-10 µm | 172 | 2 | 1.0 | 39.9 |
| 2-20 µm | 172 | 2 | 3.7 | 47.0 |
| 5-15 µm | 69 | 6 | 24.6 | 32.1 |
| 5-15 µm + 10% 2 µm | 69 | 6 | 19.5 | 38.6 |
| 5-15 µm + 20% 2 µm | 69 | 6 | 17.6 | 35.7 |
| 2-10 µm | 69 | 6 | 2.0 | 58.4 |
| 2-20 µm | 69 | 6 | 8.7 | 41.9 |
| 5-15 µm | 137 | 6 | 19.4 | 40.2 |
| 5-15 µm + 10% 2 µm | 137 | 6 | 17.7 | 44.4 |
| 5-15 µm + 20% 2 µm | 137 | 6 | 11.6 | 44.7 |
| 2-10 µm | 137 | 6 | 1.2 | 34.3 |
| 2-20 µm | 137 | 6 | 4.9 | 51.1 |
| 5-15 µm | 172 | 6 | 14.7 | 47.5 |
| 5-15 µm + 10% 2 µm | 172 | 6 | 12.5 | 53.2 |
| 5-15 µm + 20% 2 µm | 172 | 6 | 7.1 | 53.6 |
| 2-10 µm | 172 | 6 | 0.4 | 27.2 |
| 2-20 µm | 172 | 6 | 1.3 | 38.8 |

We claim:

1. A module for separating oxygen from an oxygen-containing gaseous mixture, the module comprising a plurality of planar solid-state membrane units, each planar solid-state membrane unit comprising:

a first planar dense mixed conducting oxide layer having no connected-through porosity, the first planar dense mixed conducting oxide layer having a first face and a second face, the second face opposite the first face;

a first planar channel-free porous support layer having connected-through porosity, the first planar channel-free porous support having a first face and a second face, the second face opposite the first face, the first face of the first planar channel-free porous support layer contiguous with the second face of the first planar dense mixed conducting oxide layer;

a first planar channeled porous support layer having connected-through porosity, the first planar channeled porous support layer having a first face and a second face, the second face opposite the first face, the first face of the first planar channeled porous support layer contiguous with the second face of the first planar channel-free porous support layer;

a second planar dense mixed conducting oxide layer having no connected-through porosity, the second planar dense mixed conducting oxide layer having a first face and a second face, the second face opposite the first face;

a second planar channel-free porous support layer having connected-through porosity, the second planar channel-free porous support having a first face and a second face, the second face opposite the first face, the first face of the second planar channel-free porous support layer contiguous with the second face of the second planar dense mixed conducting oxide layer; and an outer rim circumscribing the first planar dense mixed conducting oxide layer, the second planar dense mixed conducting oxide layer, the first planar channel-free porous support layer, the second planar channel-free porous support layer, and the first planar channeled porous support layer, the outer rim comprising a dense mixed conducting oxide layer having no connected-through porosity, wherein the dense mixed conducting oxide layer of the outer rim connects the first planar dense mixed conducting oxide layer to the second planar dense mixed conducting oxide layer;

wherein the porosity of the first planar channeled porous support layer is less than the porosity of the first planar channel-free porous support layer.

2. The module of claim 1 wherein the porosity of the first planar channeled porous support layer is between 1% and 45% and the porosity of the first planar channel-free porous support layer is between 10% and 50%.

3. The module of claim 1 further comprising:

a second planar channeled porous support layer having connected-through porosity, the second planar channeled porous support layer having a first face and a second face, the second face opposite the first face, the first face of the second planar channeled porous support layer contiguous with the second face of the second planar channel-free porous support layer;

wherein the porosity of the second planar channeled porous support layer is less than the porosity of the second planar channel-free porous support layer.

4. The module of claim 3 wherein the porosity of the second planar channeled porous support layer is between 1% and 45% and the porosity of the second planar channel-free porous support layer is between 10% and 50%.

5. The module of claim 3 further comprising:

one or more planar intermediate support layers, the one or more intermediate support layers interlaying the second face of the first planar channeled porous support layer and the second face of the second planar channeled porous support layer.

6. The module of claim 5 wherein the outer rim further comprises a channel-free porous support layer having connected-through porosity contiguous with the dense mixed conducting oxide layer of the outer rim wherein the channel-free porous support layer of the outer rim separates the dense mixed conducting oxide layer of the outer rim from the first planar channeled porous support layer, the second planar channeled porous support layer, and the one or more planar intermediate support layers.

7. The module of claim 1 wherein the outer rim further comprises a channel-free porous support layer having connected-through porosity contiguous with the dense mixed conducting oxide layer of the outer rim wherein the channel-free porous support layer of the outer rim separates the dense mixed conducting oxide layer of the outer rim from the first planar channeled porous support layer.

8. The module of claim 1 wherein each of the first planar dense mixed conducting oxide layer, the second planar dense mixed conducting oxide layer, the first planar channel-free porous support layer, the second planar channel-free porous support layer, the first planar channeled porous support layer, a second planar channeled porous support layer, if present, one or more planar intermediate support layers, if present, the dense mixed conducting oxide layer of the outer rim, and a channel-free porous support layer of the outer rim, if present, comprise a mixed conducting metal oxide material, each of the mixed conducting metal oxide materials having the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral.

9. The module of claim 1 further comprising a conduit operatively connected to the plurality of planar solid-state membrane units for conveying oxygen that has been separated from the oxygen-containing gaseous mixture by transport through at least one of the first planar dense mixed conducting oxide layer and the second planar dense mixed conducting oxide layer of each membrane unit and passage into the conduit via at least one of the first planar channel-free porous support layer and the second planar channel-free porous support layer of each membrane unit, wherein the conduit comprises a dense layer.

10. The module of claim 9 wherein the first planar dense mixed conducting oxide layer in each and every membrane unit has a thickness ranging from 0.1 micrometer to 1000 micrometer, the second planar dense mixed conducting oxide layer in each and every membrane unit has a thickness ranging from 0.1 micrometer to 1000 micrometer, the dense mixed conducting oxide layer of the outer rim in each and every membrane unit has a thickness ranging from 0.1 micrometer to 5000 micrometer, and the dense layer in each and every conduit in each and every membrane unit has a thickness ranging from 0.1 micrometer to 5000 micrometer.

11. The module of claim 1 wherein the first planar dense mixed conducting oxide layer in each and every membrane unit has a thickness ranging from 0.1 micrometer to 1000 micrometer, the second planar dense mixed conducting oxide layer in each and every membrane unit has a thickness ranging from 0.1 micrometer to 1000 micrometer, and the dense mixed conducting oxide layer of the outer rim in each and every membrane unit has a thickness ranging from 0.1 micrometer to 5000 micrometer.

12. The module of claim 1 wherein $$1 \leq \frac{Q_1 d_1^2 z_1}{Q_2 d_2^2 z_2} \leq 100$$

and $$1 \leq \frac{d_1^3 / Q_1}{d_2^3 / Q_2} \leq 100,$$

where $Q_1$ is the stiffness of the first planar channeled porous support layer having connected-through porosity, $Q_2$ is the stiffness of the first planar dense mixed conducting oxide layer having no connected-through porosity, $d_1$ is the thickness of the first planar channeled porous support layer having connected-through porosity, $d_2$ is the thickness of the first planar dense mixed conducting oxide layer having no connected-through porosity, $z_1$ is the distance from the first planar channeled porous support layer having connected-through porosity to the mid-plane of the planar solid-state membrane unit comprising the first planar channeled porous support layer, $z_2$ is the distance from the first planar dense mixed conducting oxide layer having no connected-through porosity to the mid-plane of the planar solid-state membrane unit comprising the first planar dense mixed conducting oxide layer, where the mid-plane is the plane equidistant from the outer planar surfaces of the planar solid-state membrane unit.

13. The module of claim 3 wherein $$1 \le \frac{Q_3 d_3^2 z_3}{Q_4 d_4^2 z_4} \le 100$$

and $$1 \le \frac{d_3^3/Q_3}{d_4^3/Q_4} \le 100,$$

where $Q_3$ is the stiffness of the second planar channeled porous support layer having connected-through porosity, $Q_4$ is the stiffness of the second planar dense mixed conducting oxide layer having no connected-through porosity, $d_3$ is the thickness of the second planar channeled porous support layer having connected-through porosity, $d_4$ is the thickness of the second planar dense mixed conducting oxide layer having no connected-through porosity, $z_3$ is the distance from the second planar channeled porous support layer having connected-through porosity to the mid-plane of the planar solid-state membrane unit comprising the second planar channeled porous support layer, $z_4$ is the distance from the second planar dense mixed conducting oxide layer having no connected-through porosity to the mid-plane of the planar solid-state membrane unit comprising the second planar dense mixed conducting oxide layer, where the mid-plane is the plane equidistant from the outer planar surfaces of the planar solid-state membrane unit.

14. The module of claim 1 wherein the first planar channeled porous support layer and/or the second planar channeled porous support layer, if present, has a volume-average pore radius, $\bar{a}$, ranging from 0.1 to 100 microns, where $$\bar{a} = \frac{\int_0^{V_g} a \, dV}{V_g},$$

where V is the volume per unit mass of pores having radius a, $V_g$ is the total pore volume per unit mass, and where a, V, and $V_g$ are measured by mercury porosimetry.

15. The module of claim 3 wherein the second planar channeled porous support layer has a volume-average pore radius, $\bar{a}$, ranging from 0.1 to 100 microns, where $$\bar{a} = \frac{\int_0^{V_g} a \, dV}{V_g},$$

where V is the volume per unit mass of pores having radius a, $V_g$ is the total pore volume per unit mass, and where a, V, and $V_g$ are measured by mercury porosimetry.

16. The module of claim 1 wherein the porosity of the first planar channel-free porous support layer is at least the porosity of the first planar channeled porous support layer plus at least 5%, and/or wherein the porosity of the second planar channel-free porous support layer, if present, is at least the porosity of the second planar channeled porous support layer plus at least 5%.

17. The module of claim 1 further comprising
a first porous outer layer having connected-through porosity, the first porous outer layer having a first face and a second face, the second face opposite the first face, the first face of the first porous outer layer contiguous with the first face of the first planar dense mixed conducting oxide layer,
and/or
a second porous outer layer having connected-through porosity, the second porous outer layer having a first face and a second face, the second face opposite the first face, the first face of the second porous outer layer contiguous with the first face of the second planar dense mixed conducting oxide layer.

* * * * *